UNITED STATES PATENT OFFICE.

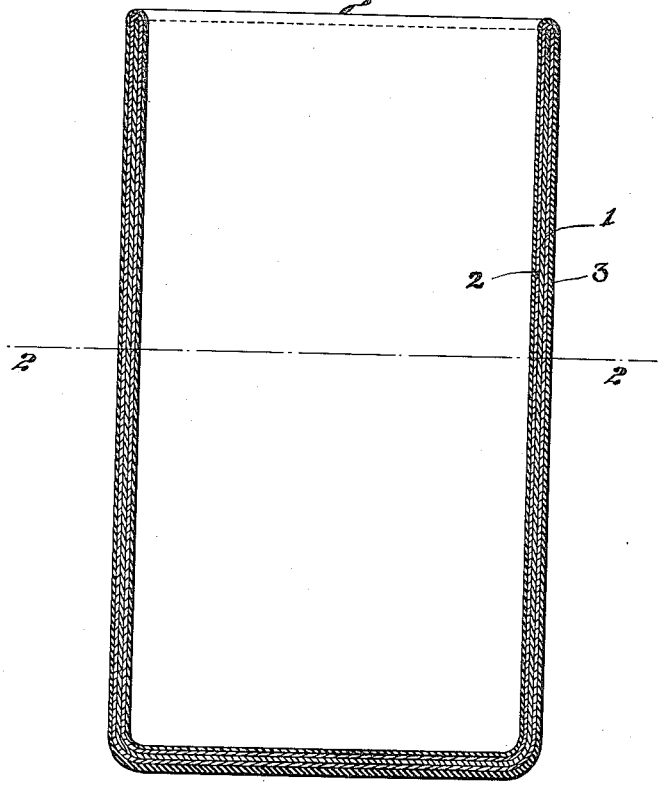
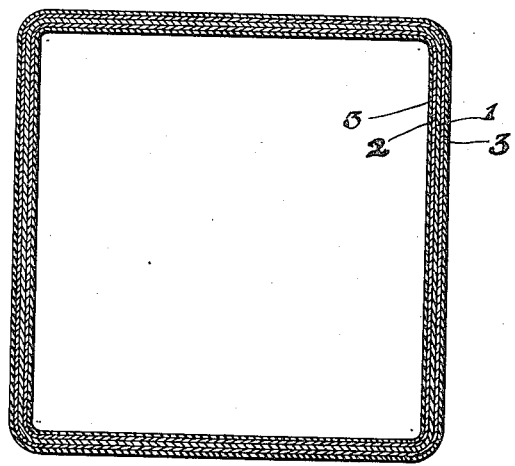

HENRY S. HAYWARD, JR., OF SPRING LAKE, NEW JERSEY.

REINFORCED BATTERY-BOX.

1,311,558.
Specification of Letters Patent.
Patented July 29, 1919.

Application filed December 11, 1912. Serial No. 736,097.

*To all whom it may concern:*

Be it known that I, HENRY S. HAYWARD, Jr., a citizen of the United States, and a resident of Spring Lake, county of Monmouth, State of New Jersey, have invented certain new and useful Improvements in Reinforced Battery-Boxes, of which the following is a specification.

In electric storage batteries, it is necessary that the box or jar containing the electrolyte and the plates, be made of an insulating material, and it has been the custom heretofore to use hard rubber or vulcanite, for this purpose, rather than glass or any other material by reason of its relative lightness and its ability to withstand shocks such as are met with when these batteries are used in vehicles.

In the so-called Edison type of battery, a metal container is sometimes used, but great difficulty has been experienced by reason of electrolytic action upon the exterior of these containers by reason of moisture, when they are placed together in a battery of a plurality of cells.

The hard rubber or vulcanite ordinarily used is gradually attacked and softened by the electrolyte, which thus causes the rubber to bend or buckle, and, consequently, the jars to leak. A sudden shock also may cause the hard rubber to crack or break. The object of my invention is to produce a container suitable for this purpose, although it may be used for any other purpose to which it may be found suitable, which shall be light, strong, have good insulating qualities and not liable to breakage.

Referring to the drawing accompanying this specification, I have shown at Figure 1 a vertical cross-section of my improved battery box, and at Fig. 2 a horizontal cross-section on the line 2—2 of Fig. 1.

The box consists preferably of a metal reinforcement 1, over which is laid a layer of soft rubber 2, which layer completely incloses the metal reinforcement 1. On top of the layer of soft rubber 2, is a layer of hard rubber or vulcanite 3, which completely incloses the metal reinforcement 1 and soft rubber layer 2. My improved battery box is preferably made as follows:

I first cover the metal reinforcement 1 which is preferably made in the form of a box, and is relatively thin, with a coating of alloy described in the Daft application, Serial No. 564,840 now Patent Number 1,120,794 of Dec. 15, 1914. I then cover the metal reinforcement with the soft rubber layer 2, and the hard rubber layer 3, and vulcanize the whole at one time. The hard and soft rubber layers will be vulcanized together and the soft rubber layer will be vulcanized to the metal reinforcement in the manner described in the said Daft application.

The purpose of the soft rubber layer 2 is to allow for the difference in the co-efficients of expansion of the hard rubber layer 3, and the metal reinforcement 1, so that they may expand and contract in a measure independently of each other, the differences being taken up by the soft rubber layer 2. The soft rubber layer also forms a cushion so that if the outer hard rubber layer 3 be struck a blow it will be able to bend inward slightly without being broken.

It is evident that I may dispense with the outer hard rubber layer, making the soft rubber layer slightly thicker, but I prefer to make the outer layer of hard rubber on account of its durability, resistance to puncture and appearance.

While I have described the preferred form of my invention, it is obvious that other forms may be devised without departing from the spirit of my invention and I, therefore do not wish to confine myself to that shown and described. What I claim and desire to secure by Letters Patent is—

1. In an article of the class described, a rubber wall comprising a layer of hard rubber, a layer of soft rubber attached thereto, and a metal reinforcement attached to the layer of soft rubber.

2. In an article of the class described, a rubber wall comprising a layer of hard rubber, a layer of soft rubber vulcanized thereto, and a metal reinforcement attached to the layer of soft rubber.

3. In an article of the class described, a rubber wall comprising a layer of hard rubber, a layer of soft rubber attached thereto, and a metal reinforcement vulcanized to the layer of soft rubber.

4. In an article of the class described, a rubber wall comprising a layer of hard rubber, a layer of soft rubber vulcanized thereto, and a metal reinforcement vulcanized to the layer of soft rubber.

5. In an article of the class described, a rubber wall comprising a layer of hard rubber, a layer of soft rubber attached thereto, and a metal reinforcement attached to and completely inclosed by the layer of soft rubber.

In witness whereof I have hereunto signed my name in the presence of two witnesses, this 20th day of November, 1912.

HENRY S. HAYWARD, JR.

Witnesses:
RUTH K. VAN VALEN,
ARTHUR VHYDLF.